United States Patent [19]

Laurent

[11] Patent Number: 4,799,241

[45] Date of Patent: Jan. 17, 1989

[54] METHOD AND DEVICE FOR SYMBOL SYNCHRONIZATION AND THEIR APPLICATION TO THE SYMBOL DEMODULATION OF DIGITAL MESSAGES

[75] Inventor: Pierre A. Laurent, Bessancourt, France

[73] Assignee: Thomson-CSF, Paris, France

[21] Appl. No.: 99,598

[22] Filed: Sep. 22, 1987

[30] Foreign Application Priority Data

Sep. 23, 1986 [FR] France .................. 86 13286

[51] Int. Cl.$^4$ ............................................. H04L 7/06
[52] U.S. Cl. ........................................ 375/113; 375/118
[58] Field of Search ................... 375/23, 29, 41, 44, 375/45, 47, 88, 90, 106, 111, 113, 96, 101, 118; 240/825.76, 825.71

[56] References Cited

U.S. PATENT DOCUMENTS

| | | | |
|---|---|---|---|
| 4,306,308 | 10/1981 | Nossen | 375/113 X |
| 4,577,334 | 3/1986 | Boer et al. | 375/111 X |

FOREIGN PATENT DOCUMENTS

| | | |
|---|---|---|
| 0023852 | 2/1981 | European Pat. Off. . |
| 2358056 | 2/1978 | France . |
| 2493646 | 7/1982 | France . |

OTHER PUBLICATIONS

Patent Abstracts of Japan, vol. 9, No. 110 (E-314) [1833], May 15, 1985; & JP-A-60 135 (Toshiba K.K.) 05-01-1985.

*Primary Examiner*—A. D. Pellinen
*Assistant Examiner*—Derek S. Jennings
*Attorney, Agent, or Firm*—Oblon, Fisher, Spivak, McClelland & Maier

[57] ABSTRACT

The symbol synchronization method for the symbol demodulation of a digital signal uses E sequences of samples taken from the demodulated signal, each sequence being offset with respect to the following one by a fraction of the symbol period Ts/E. On the basis of each one of E sequences of samples (Si1,Si2, ... SiN) ranging from from i=0 to E-1, a value F(i) of a predefined function F, optimized according to the type of modulation made at emission, is calculated. This function, which can be identified with a sine model, $A+B\cos(i-i_0)2\pi/E$, can be used to determine $i_0$ characteristic of the synchronization time-shift and, if necessary, A, characteristic of the d.c. offset, and B, characteristic of the variation in levels due to reception conditions. These values are used to correct the synchronization signal and, if necessary, the d.c. and the decision thresholds of the decision circuit during the symbol demodulation.

10 Claims, 2 Drawing Sheets

FIG_1
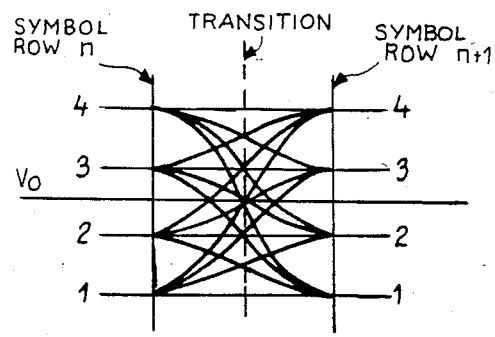
FIG_2
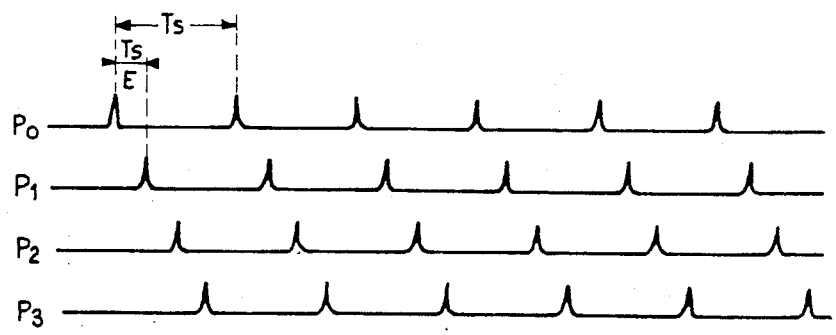
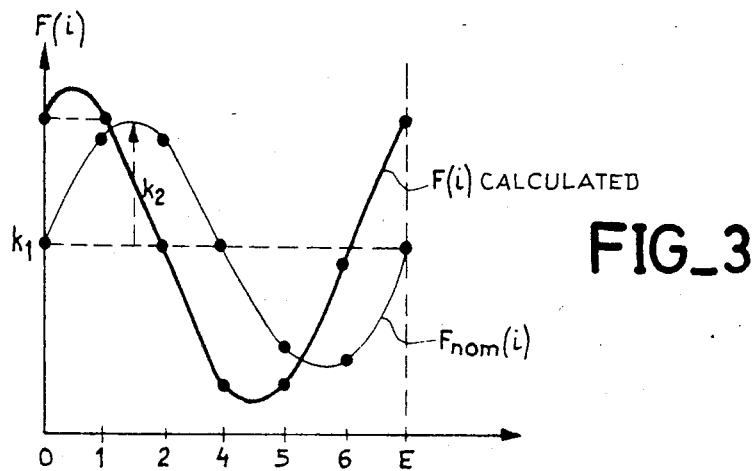
FIG_3

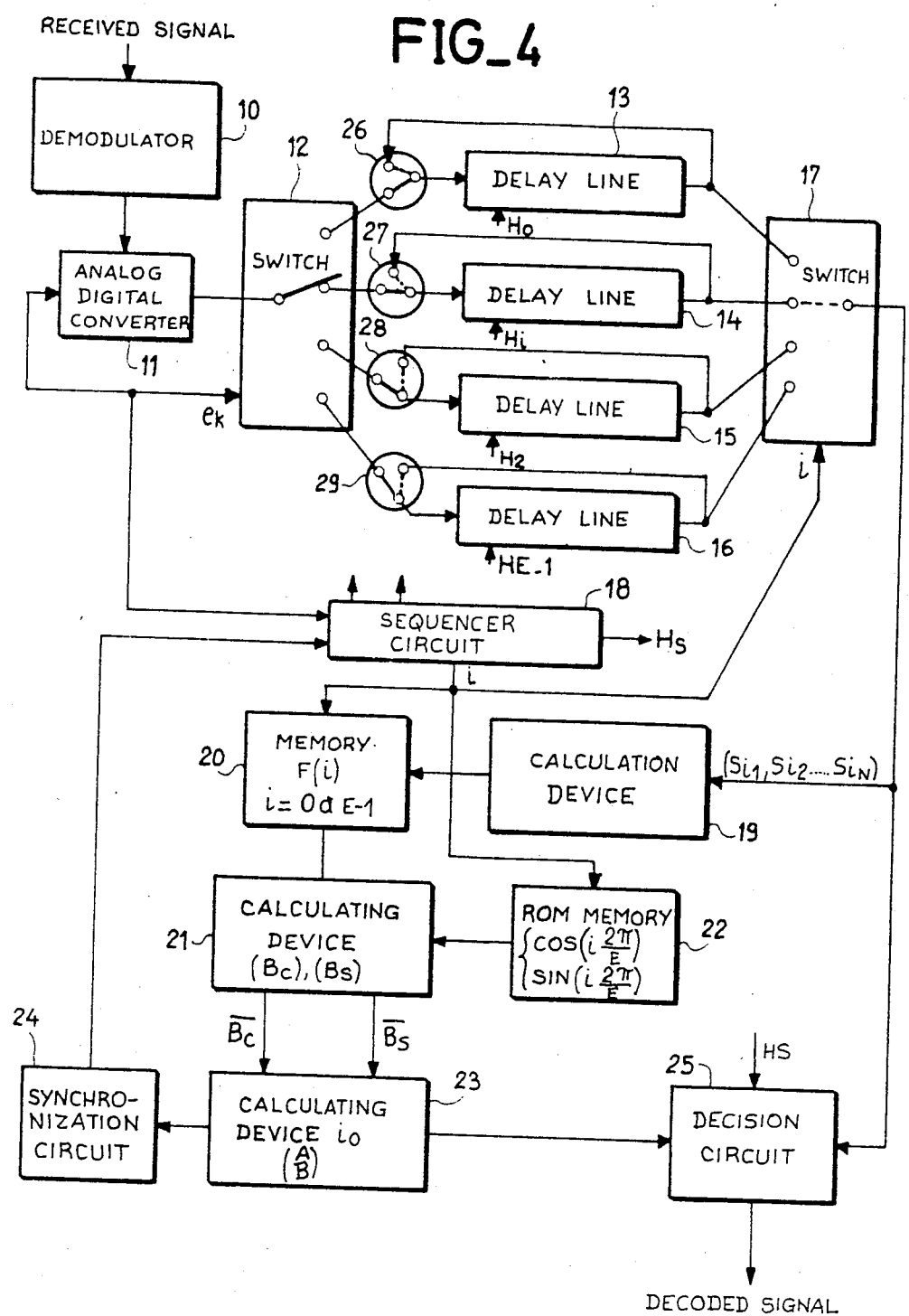

METHOD AND DEVICE FOR SYMBOL SYNCHRONIZATION AND THEIR APPLICATION TO THE SYMBOL DEMODULATION OF DIGITAL MESSAGES

BACKGROUND OF THE INVENTION

1. Field of the Invention

The invention pertains to the field of digital communications and, more particularly, to the symbol demodulation of digital messages.

To take decisions pertaining to the successive values of symbols, a symbol synchronizing signal is established from the demodulated digital signal, it being assumed, besides, that the frame synchronization of the digital messages has been done.

2. Description of the Prior Art

Conventionally, for digital messages comprising a sequence of two opposite levels characteristic of a succession of binary symbols ($+1$ and $-1$), the points where the signal reaches zero are used to determine the symbol synchronizing signal. This is done by detecting the points at which the signal crosses zero either in one direction only (the rising direction, for example) when the signal exhibits no d.c. offset or in both directions (rising and descending) so as to establish the mean positions of the transitions and hence, the sampling instants (in the case of d.c. offsets). This method is suitable when the signal passes through zero a sufficient number of times and for two-level messages. By contrast, when the signal passes zero infrequently, there is a risk that the transitions between symbols will not be precisely determined. Furthermore, this method cannot be applied to messages comprising symbols chosen from an alphabet of several symbols associated with more than two levels. In the latter case, the inter-symbol transitions do not more necessarily coincide with the points at which the digital signal passes zero.

Finally, when there is a d.c. level offset (for example at the output of a frequency discriminator), it is no longer possible to position the transitions precisely, thus giving rise to errors when taking decisions on the symbols.

SUMMARY OF THE INVENTION

An object of the invention is a method, and a corresponding device, for symbol synchronization, a method which removes the disadvantages of systems used in the prior art, which is reliable independently of the content of the information, is insensitive to variations in the d.c. level and can be used for several types of modulations.

The invention pertains to a symbol synchronizing method for the symbol demodulation of a digital signal, a method wherein:

The signal is sampled to form E sequences of samples at intervals of the symbol period Ts (Si1 ... Sij ... SiN), i varying from 0 to E−1 and j varying from 1 to N, the samples of the same number j in two successive sequences of numbers i and i+1 being time-shifted with respect to one another by a fraction of Ts/E of a symbol period Ts, A value $F(i) = F(Si1 \ldots Sij, \ldots, SiN)$ of a function F is calcuted for each sequence of samples, F being chosen beforehand, according to the type of modulation used at emission, so that the nominal value of the function varies according to i and so that these variations can be identified with those of a sine model varying according to $\cos(i2\pi/E)$, The values F(i) are identified with corresponding values of the model $A + B \cos((i-i_0)2\pi/E)$ to determine $i_0$, $i_0$ being characteristic of the synchronization time-shift to be applied to the synchronization signal of the decision circuit which performs the symbol demodulation.

Another object of the invention is a symbol synchronizing device to use the synchronizing method referred to above, a device comprising a sampler of E sequences of samples of the signal with the symbol period Ts, the symbols of the same number being time-shifted from one sequence to the following one, by one fraction Ts/E of the symbol period Ts; the said symbol synchronizing device also comprising a device to process the samples establishing, on the basis of each sequence, a value F(i) of a pre-defined function F, calculated from the values of the samples of the sequence, with i varying from 0 to E-1, the number N of samples of each sequence being sufficient so that the values F(i) depend only on the type of modulation and the conditions of reception; the said symbol synchronizing device further comprising a circuit to process the values F(i) coupled with the samples-processing circuit to determine, on the basis of E values of the function F(i), the synchronizing time-shift to be applied to a decision circuit on the values of the symbols, with a sequencer circuit managing all the circuits.

Another object of the invention is the application of the method to the symbol demodulation of digital messages.

BRIEF DESCRIPTION OF THE DRAWINGS

The invention will be better understood and other of its features will appear from the following description, made with reference to the appended figures, of which:

FIG. 1 illustrates the modulated signal transitions possible for a four-level modulation;

FIG. 2 shows the sampling control signals, time-shifted to form sequences of samples;

FIG. 3 illustrates the variation of a function F, firstly under the nominal conditions $F_{nom}(i)$ and, secondly, calculated with sequences of samples, with F(i) calcuated.

FIG. 4 is a block diagram of an embodiment of the synchronizing device according to the invention.

DESCRIPTION OF THE PREFERRED EMBODIMENT

If, in seeking the best synchronizing signal from a series of E sampling comb filters, each controlled by a reference signal with the period Ts of the symbols, the signals at the various comb filters being evenly time-shifted from one signal to the next one by Ts/E to distribute the sampling moments over the duration of a symbol by means of these various comb filters, an object of invention is a processing of the modulation signal samples coming from these various sampling comb filters, leading to the determination of the symbol synchronizing signal and achieving optimum sampling from decision-making.

For this purpose, the invention uses the fact that, for a given type of modulation, it is possible to find, for example, an FSK binary modulation or, again, a four-level modulation, a function of the index i of the various comb filters, calculated on the basis of sequences of samples available at the output of the comb filters 0, 1, ... i, ... E−1, varying periodically at the period E with a variation as a function of i which can be compared to a sine of the period E. When the synchronization is right, and when the amplitude at the output of the demodulator is also right, and there is no d.c. offset, this function F(i) coincides with a nominal function $F_{nom}(i)$ which is characteristic of the modulation, and can be identified with a sine model.

When the conditions are not those indicated above and, especially, when the synchronization is not right, the function F(i), calculated on the basis of real sequences of samples, deviates from the corresponding nominal function $F_{nom}(i)$ and, hence, from the associated sine model, especially in phase. The determination of the phase shift makes it possible to recover the synchronization conditions.

The synchronization process precisely described below can also be used to adapt the amplitude of the output signal of the signal demodulator and even to determine the d.c. offset. The functions capable of being calculated may be, for example, the variance for each series of samples given by the comb filters or the sum of the absolute values of the differences of the samples of a sequence with respect to their mean or the corrected self-correlation, either of these functions being chosen according to the types of symbol modulation at emission, as will be specified below.

FIG. 1 shows, as an example, all the transitions possible for a four-level modulation, these levels being marked 1, 2, 3 and 4. The mean level $V_0$, which may be equal to 0V, corresponds to transitions only for certain sequences of symbols n, n+1. As indicated above, solely the detection of the points where the signal passes through zero cannot be used to determine the synchronization.

FIG. 2 shows, as an example, the sampling instants, as a function of time, for four sampling comb filters P0, P1, P2 and P3, the reference signals of which are time-shifted from one signal to the next one by Ts/4; let (SO1, SO2 ... SOj ... SON) be the sequence of samples from the comb filter P0, (Si1 ... Sij ... SiN) the sequence of samples from the comb filter i. Let F be the function chosen for the modulation type of the signal received. The value of this function, calculated with the sequence of samples coming from the comb filter with the index i is F(i)=F(Si1 ... Sij ... SiN). The number N of samples taken is sufficient for the value of this function not to depend on the information contained in the demodulated signal.

As indicated above, F(i) calculated with real samples is periodic with a period E:

F(i)=F(i+E), and this function can be identified with a sine model. FIG. 3 shows an example of the function F(i) which shows the nominal function $F_{nom}(i)$ and the function calculated with sequences of samples available at the sampling comb filters, for an information sequence.

The real function F(i) can be identified with a model expressed according to the nominal function in the following way:

F(i)=A+B. $F_{nom}$ (i−io) where A and B depend on the receiving conditions and io is characteristic of the time shift. The determination of io will make it possible to choose the sampling comb filter that gives the best synchronization in relation to the demodulated signal received, for subsequent processing for decision-making.

A depends on the d.c. offset and B corresponds to the variation in spacing of the levels received.

To identify the real function, calculated using the samples received with its model, corresponding to the sine model associated with the nominal function shifted in amplitude and in phase, the deviation between F(i) and its model A+B COS (i−io)2π/E should be minimized. A, B and io will thus be values which will minimize, according to the least error squares method for example, the expression:

Sum (F(i)−(A+B COS (i−io) 2π/E)))² for i varying between 0 and E−1, or Sum (F(i)-A-$B_C$ COS (i2π/E)-$B_S$ SIN (i2π/E))² with Ti $B_C$=B·COS io 2π/E $B_S$=B SIN io 2π/E.

Calculations show that the best approximation leads to:

$A$ = Sum (F(i))/E $B_C$ = (2/E) (Sum $F(i)$·COS (i2π/E))

$B_S$ = (2/E) (Sum $F(i)$·SIN (i2π/E))

The value of io can then be determined immediately from the values $B_C$ and $B_S$.

The optimum sampling instant is then deduced from this value (this instant being determined by the known fixed time-shift To (which may be zero), a function of the modulation and of the function F used) with respect to the value of io thus determined.

The symbol synchronization method generally described above is illustrated below by means of a few examples.

In a first example, the function F (i) used to process samples from the sampling comb filters, is the variance function which characterizes the divergence of the signal with respect to its mean:

F(i)=(1/N). (Sum Sij)²-(1/N).(Sum Sij)², for j varying between 1 and N.

For an FSK modulated binary signal varying between −A and A, the maximum of F(i) is A² and the minimum is A²/2. This function can be identified with a sine wave and quite fulfils the condition set, the difference between the extremes being sufficient to give a good contrast.

For a modulated signal with four levels, where the four equidistant levels associated with these levels are −A, −A/3, +A/3 and +A, N being great enough for the four levels in the sequence to have a uniform statistical distribution, the maximum of the function F(i) is 5A²/9 while its minimum is A²/3. The difference between these two extremes is 2A²/9. This function only results in a fairly weak contrast, but one which is sufficient to determine the necessary time-shift.

Another example of a usable function may be the function which is the sum of the absolute values of the differences between the samples and their mean, namely: F(i)=Sum|Sij−(1/N)(Sum Sij)|, for j varying between 1 and N.

A third example may be a "corrected" self-correlation function, namely a function of the type:

F(i)=Sum ((Sij−Sij'), for j'=j−1 and with j varying between 1 and N. This function gives good results for a major number of types of modulation, even when the signal has a d.c. offset. The function used to determine io should be suited to the various types of modulation and signals received. For, in certain cases, a function chosen, for example, from among those described above can, depending on i, be almost constant for packets of samples, and this would not make it possible to determine a time-shift. It is therefore necessary to optimize the function so that the nominal function presents a variation, so that this variation can be identified with a sine wave and so that this very same function also leads to sufficient variations with packets of real samples.

FIG. 4 shows a block diagram of the symbol synchronizing device according to the invention. This diagram highlights the various functional subsets for processing, and therefore makes it possible to specify the invention.

In practice, the device could be made by means of a microprocessor suited to signal processing, for example a circuit of the TMS 32010 or TMS 32020 types made by TEXAS INSTRUMENTS with the adapted memory in which it is possible to store the fixed parameters needed to process the digital values associated with the signal sample packets sampled in the demodulated signal. These values could be read in the memory when necessary for processing, and could be erased only after the demodulation is performed by the decision circuit.

FIG. 4 is a non-detailed depiction of the signal demodulator 10 to which the received signal is applied and which gives a demodulated signal to an analog/digital converter 11 that receives a clock signal CK with the period Ts/E, given by the sequencer circuit 18. This converter delivers, at its output, a sequence of digital values characteristic of the samples. These values are transmitted cyclically to the inputs of E time-delay lines with N stages (E=4 in the figure) by means of a periodic switch 12 also controlled by the clock signal CK with the period Ts/E. All the time-delay lines, 13, 14, 15, 16 in the figure thus receive samples at intervals of Ts, with thei$^{th}$ line storing samples time-shifted by Ts/E with respect to the preceding one by means of clock signals with a period Ts, time-shifted by $H_o \ldots H_1 \ldots H_{E-1}$. The packets of samples thus formed correspond to the signals Si coming from the sampling filter combs indicated above in the description of the synchronizing method.

To determine the synchronization time-shift, the samples are processed cyclicly in successive packets, each coming from one time-delay line: the packet transferred for processing to the computing circuits is selected by a cyclical switch with E positions 17, controlled by the sequencer circuit 18 which, at each instant, selects the index of i of the time-delay line, the digital values of which must be extracted for the processing (Si1 ... Sij ... SiN). These packets of values are re-transmitted to a device 19 for the calculation of the function F(i). After they are calculated, the calculated values of this function for the E time-shifted sequences are memorized in a memory 20. A calculating device 21 reads, in the memory 20, the E values of the function F(i) corresponding to an information packet of N symbols, to calculate the values $B_C$ and $B_S$. The fixed values COS ($i2\pi/E$) and SIN ($i2\pi/E$) are memorized in a read-only memory 22 and are read for the calculation, the memory 22 being addressed by the index i. The values $B_C$ and $B_S$ are then standardized, the standardized values $(B_C)=B_C B$ and $(B_S)=B_S/B$, where $$B = \sqrt{B_C^2 + B_S^2},$$

being applied to a calculating device 23 typically a table memory which deduces io from $B_C$ and $B_S$. The digital value of io, then determined, is applied to a synchronization circuit 24 which, on the basis of the value io and of the fixed time-shift To, if any, according to the choice of the function F and to the type of modulation, controls a synchronization time-shift, if any. For this, the output of this circuit is connected to the sequencer 18 which gives the synchronization clock Hs, identical to either of the clocks with the symbol period Hi, applied to the time-delay lines.

If the resolution is greater than Ts/E, the values used for decision-making may result from an interpolation between the digital values associated with the two time-delay lines controlled by the clocks Hi and Hi+1, the two pips of which frame the synchronization pips determined from io onwards. In the solution shown in FIG. 4, Hs is assumed to be one of the signals $H_o \ldots H_{E-1}$, and the values applied to the decision-making circuit 25 are those coming from the correctly-synchronized time-delay line with an index i. So that the useful values, previously used for the cyclical calculation, are not lost and so that they are transmitted to the decision circuit, the time-delay lines are looped while input switches, 26, 27, 28 and 29 respectively, are connected between the outputs of the cyclical switch 12, the outputs of the time-delay lines 13, 14, 15 and 16 and the inputs of these same time-delay lines.

The device described above performs the synchronization periodically, in processing packets of values. It is also possible, notably with a microprocessor adapted to signal processing, to work continuously, for example, by using two sets of memories working alternately in two cycles, one for synchronization and the other for decision making or by making the calculation on sliding information packets, time-shifted by one or more symbols at each calculation.

As indicated above, other information usable by the decision circuit can also be deduced from the processing operation, especially data relating to the d.c. offset by A=(Sum F(i))/E, or information pertaining to the variation of the levels by $$B = \sqrt{B_C^2 + B_S^2}.$$

The device 23 for calculating io can be planned to determine also A and B which, applied to the decision circuit 25, then controls the setting of the decision thresholds of the circuit 25. In this case, the processing provides assistance in decision-making, in addition to good symbol synchronization.

The invention is not limited to the method and device specifically described above. In particular, only simple modulated signals have been dealt with up to now. This arrangement is not restrictive and the invention also applies to a modulated signal wit two components in quadrature. Si is then a complex signal with two components and a function F may be, for example:

F(i)=Sum|(Sij−Sij')(Sij*)| which takes into account samples of two components in quadrature, Sij and Sij*.

What is claimed is:

1. A method for symbol synchronization, for the symbol demodulation of a digital signal, a method wherein:

a signal is sampled to form E sequences of samples at intervals of the symbol period Ts (Si1 ... Sij ... SiN), i varying from 0 to E−1 and j varying from 1 to N, the samples of the same number j in two successive sequences of numbers i and i+1 being time-shifted with respect to one another by a fraction Ts/E of a symbol period Ts, a value F (i)=F(Si1 ... Sij, ..., SiN) of a function F is calculated for each sequence of samples, F being chosen beforehand, according to the type of modulation used at emission, so that the nominal value of the function varies according to i and so that these variations can be identified wit those of a sine model in accordance with COS (i2$\pi$/E), values F (i) are identified with the corresponding values of the model A+B COS ((i-io)2$\pi$/E) to determine io, io being characteristic of the synchronization time-shift to be applied to a synchronization signal of a decision circuit which performs the symbol demodulation.

2. A method according to the claim 1, wherein the function F is the variance of the sequence of samples, the values F(i) being given by:

F(i)=(1/N).(Sum $Sij^2$)−(1/N).(Sum Sij)$^2$, for j varying between 1 and N.

3. A method according to the claim 1, wherein the function F is a self-correlation function, the values F(i) being given by:

F(i)=Sum |(Sij−Sij'). Sij|, where j'=j−1 for j varying between 1 and N.

4. A method according to the claim 1, wherein the function F is the function which is the sum of the absolute values of the differences of the samples with respect to their mean, the values F(i) being given by:

Sum|Sij−(1/N) (Sum Sij)| for j varying between 1 and N.

5. A method according to the claim 1, wherein processing of the values F(i) consists in calculating two values $B_C$ and $B_S$ such that, for i varying between 0 and E−1:

$B_C$=(2/E)(Sum F(i). COS (i2$\pi$/E)),
$B_S$=(2/E)(Sum F(i). SIN (i2$\pi$/E)), io being determined immediately from these two values through the resolution of the system:
$B_C$=B. COS (io 2$\pi$E)
$B_S$=B. SIN (io 2$\pi$/E).

6. A method according to the claim 5, wherein the value $$B = \sqrt{B_C^2 + B_S^2},$$

characteristic of the variation of levels owing to reception conditions, is also calculated and used in a circuit to adapt the decision thresholds to the reception conditions.

7. A method according to the claim 5, wherein the value A'Sum (F(i))/E for i varying between 0 and E−1, characteristic of the d.c. offset, is also calculated and used in reception circuits.

8. A symbol synchronization device for the symbol demodulation of a digital signal, comprising a sampler of an input digital signal to form E sequences of N samples having the symbol period Ts, said sequences being time shifted one with respect to the following one by a fraction Ts/E of the symbol period; the said symbol synchronization device also comprising a calculating device to process these sequences, for calculating, with the values of the samples of each sequence, the value F(i) of a predefined function F, with i varying from 0 to E-1, the number N of samples of each sequence being sufficient so that the values F(i) depend only on type of modulation and conditions of reception, a circuit to process the values F(i) coupled with the calculating device to determine, with the E values of the function F(i), a synchronizing time shift to be applied to a decision circuit on the values of the symbols, and a sequencer circuit controlling all the circuits.

9. A symbol synchronization device according to claim 8, wherein all processing circuits are integrated into a microprocessor adapted to signal processing.

10. A device according to the claim 8, wherein the circuit for processing the values F(i) can also calculate, with these values, the component $$B = \sqrt{B_S^2 + B_C^2}$$

characteristic of the variation of levels, and the component A=(Sum F(i))/E characteristic of the d.c. offset, these two components being used to perform respectively a decision threshold correction and a d.c. correction if necessary.

* * * * *